US011796968B2

(12) United States Patent
Roach et al.

(10) Patent No.: US 11,796,968 B2
(45) Date of Patent: *Oct. 24, 2023

(54) CROWN ASSEMBLY FOR AN ELECTRONIC WATCH

(71) Applicant: Apple Inc., Cupertino, CA (US)

(72) Inventors: Steven C. Roach, San Francisco, CA (US); Sameer Pandya, Sunnyvale, CA (US); Erik G. de Jong, San Francisco, CA (US); Erik L. Wang, Redwood City, CA (US); Peter J. Kardassakis, Mountain View, CA (US); Steven P. Cardinali, Campbell, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/507,589

(22) Filed: Oct. 21, 2021

(65) Prior Publication Data

US 2022/0043402 A1 Feb. 10, 2022

Related U.S. Application Data

(63) Continuation of application No. 16/215,607, filed on Dec. 10, 2018, now Pat. No. 11,194,298.

(Continued)

(51) Int. Cl.
*G04G 21/08* (2010.01)
*G01D 5/30* (2006.01)
(Continued)

(52) U.S. Cl.
CPC .............. *G04G 21/08* (2013.01); *G01D 5/30* (2013.01); *G04G 9/007* (2013.01); *G04G 17/08* (2013.01); *G04G 21/025* (2013.01); *G04B 37/10* (2013.01)

(58) Field of Classification Search
CPC ...... G04G 21/025; G04G 21/08; G04G 9/007; G04G 17/08; G06F 1/163; G01D 5/30; G04B 37/10
See application file for complete search history.

(56) References Cited

U.S. PATENT DOCUMENTS 2,237,860 A    4/1941   Bolle
2,288,215 A    6/1942   Taubert et al.
(Continued)

FOREIGN PATENT DOCUMENTS

CH    1888928    1/1937
CN    1302740    9/2001
(Continued)

OTHER PUBLICATIONS

Author Unknown, "Desirable Android Wear smartwatch from LG," Gulf News, Dubai, 3 pages, Jan. 30, 2015.
(Continued)

*Primary Examiner* — Edwin A. Leon
(74) *Attorney, Agent, or Firm* — Brownstein Hyatt Farber Schreck, LLP

(57) ABSTRACT

An electronic watch may include a housing defining a side wall having a through-hole and a crown assembly including an actuation member. The actuation member may include a crown shaft extending through the through-hole and having an exterior portion defining an input surface and a crown ring coupled to the exterior portion of the crown shaft and electrically isolated from the crown shaft. The crown assembly may further include an optical encoder component attached to the actuation member and defining a group of optical features. The electronic watch may further include an optical detector configured to detect rotation of the crown assembly by detecting motion of the group of optical features and an electrocardiograph sensor comprising a sensing component. The sensing component may be conductively
(Continued)

coupled to the actuation member via a conductive path at least partially defined by the crown shaft.

20 Claims, 7 Drawing Sheets

Related U.S. Application Data

(60) Provisional application No. 62/725,239, filed on Aug. 30, 2018.

(51) Int. Cl.
  *G04G 9/00* (2006.01)
  *G04G 17/08* (2006.01)
  *G04G 21/02* (2010.01)
  *G04B 37/10* (2006.01)

(56) References Cited

U.S. PATENT DOCUMENTS

| | | |
|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 3,937,002 A | 2/1976 | Van Haften |
| 4,007,347 A | 2/1977 | Haber |
| 4,031,341 A | 6/1977 | Wuthrich et al. |
| 4,037,068 A | 7/1977 | Gaynor |
| 4,051,665 A | 10/1977 | Arn |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,274,152 A | 6/1981 | Ikegami |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,559,761 A | 9/1996 | Frenkel et al. |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,738,104 A | 4/1998 | Lo |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,950,695 B2 | 9/2005 | Chen |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,009,915 B2 | 3/2006 | Brewer et al. |
| 7,016,263 B2 | 3/2006 | Gueissaz et al. |
| 7,021,442 B2 | 4/2006 | Borgerson |
| 7,031,228 B2 | 4/2006 | Born et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,111,365 B1 | 9/2006 | Howie, Jr. |
| 7,113,450 B2 | 9/2006 | Plancon et al. |
| 7,119,289 B2 | 10/2006 | Lacroix |

(56) References Cited

U.S. PATENT DOCUMENTS

| | | |
|---|---|---|
| 7,135,673 B2 | 11/2006 | Saint Clair |
| 7,167,083 B2 | 1/2007 | Giles |
| 7,187,359 B2 | 3/2007 | Numata |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,717,151 B2 | 5/2014 | Forutanpour et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,810,514 B2 | 8/2014 | Zhao et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,091,309 B2 | 7/2015 | Battlogg |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,552,023 B2 | 1/2017 | Joo et al. |

(56) References Cited

U.S. PATENT DOCUMENTS

| | | |
|---|---|---|
| 9,599,964 B2 | 3/2017 | Gracia |
| 9,600,071 B2 | 3/2017 | Rothkopf |
| 9,607,505 B2 | 3/2017 | Rothkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,632,537 B2 | 4/2017 | Memering |
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |
| 9,709,956 B1 | 7/2017 | Ely et al. |
| 9,753,436 B2 | 9/2017 | Ely et al. |
| D800,172 S | 10/2017 | Akana |
| 9,800,717 B2 | 10/2017 | Ma et al. |
| 9,836,025 B2 | 12/2017 | Ely et al. |
| 9,873,711 B2 | 1/2018 | Hoover et al. |
| 9,874,945 B2 | 1/2018 | Fukumoto |
| 9,886,006 B2 | 2/2018 | Ely et al. |
| 9,891,590 B2 | 2/2018 | Shim et al. |
| 9,891,651 B2 | 2/2018 | Jackson et al. |
| 9,891,667 B2 | 2/2018 | Jung et al. |
| 9,898,032 B2 | 2/2018 | Hafez et al. |
| 9,913,591 B2 | 3/2018 | Lapetina et al. |
| 9,921,548 B2 | 3/2018 | Mitani |
| 9,927,902 B2 | 3/2018 | Burr et al. |
| 9,939,923 B2 | 4/2018 | Sharma |
| 9,946,297 B2 | 4/2018 | Nazzaro et al. |
| 9,952,558 B2 | 4/2018 | Ely |
| 9,952,682 B2 | 4/2018 | Zhang et al. |
| 9,971,305 B2 | 5/2018 | Ely et al. |
| 9,971,405 B2 | 5/2018 | Holenarsipur et al. |
| 9,971,407 B2 | 5/2018 | Holenarsipur et al. |
| 9,979,426 B2 | 5/2018 | Na et al. |
| 10,001,817 B2 | 6/2018 | Zambetti et al. |
| 10,012,550 B2 | 7/2018 | Yang |
| 10,018,966 B2 | 7/2018 | Ely et al. |
| 10,019,097 B2 | 7/2018 | Ely et al. |
| 10,037,006 B2 | 7/2018 | Ely |
| 10,037,081 B2 | 7/2018 | Grant |
| 10,048,802 B2 | 8/2018 | Shedletsky |
| 10,057,470 B2 | 8/2018 | Kim et al. |
| 10,061,399 B2 | 8/2018 | Bushnell et al. |
| 10,066,970 B2 | 9/2018 | Gowreesunker et al. |
| 10,092,203 B2 | 10/2018 | Mirov |
| 10,108,016 B2 | 10/2018 | Bosveld |
| 10,114,342 B2 | 10/2018 | Kim et al. |
| 10,145,711 B2 | 12/2018 | Boonsom et al. |
| 10,175,652 B2 | 1/2019 | Ely et al. |
| 10,190,891 B1 | 1/2019 | Rothkopf et al. |
| 10,203,662 B1 | 2/2019 | Lin et al. |
| 10,209,148 B2 | 2/2019 | Lyon et al. |
| 10,216,147 B2 | 2/2019 | Ely et al. |
| 10,222,755 B2 | 3/2019 | Coakley et al. |
| 10,222,756 B2 | 3/2019 | Ely et al. |
| 10,222,909 B2 | 3/2019 | Shedletsky et al. |
| 10,234,828 B2 | 3/2019 | Ely et al. |
| 10,241,593 B2 | 3/2019 | Chen |
| 10,296,125 B2 | 5/2019 | Ely et al. |
| 10,331,081 B2 | 6/2019 | Ely et al. |
| 10,331,082 B2 | 6/2019 | Ely et al. |
| 10,332,111 B2 | 6/2019 | Mokhasi et al. |
| 10,353,487 B2 | 7/2019 | Chung et al. |
| 10,379,629 B2 | 8/2019 | Bushnell et al. |
| 10,386,940 B2 | 8/2019 | Kim |
| 10,401,961 B2 | 9/2019 | Cruz-Hernandez et al. |
| 10,429,959 B2 | 10/2019 | Battlogg |
| 10,474,194 B1 | 11/2019 | Ell et al. |
| 10,503,258 B2 | 12/2019 | Holenarsipur et al. |
| 10,509,486 B2 | 12/2019 | Bushnell et al. |
| 10,524,671 B2 | 1/2020 | Lamego |
| 10,534,320 B2 | 1/2020 | Ferri |
| 10,551,798 B1 | 2/2020 | Bushnell et al. |
| 10,572,053 B2 | 2/2020 | Ely et al. |
| 10,593,617 B2 | 3/2020 | Ashikaga et al. |
| 10,599,101 B2 | 3/2020 | Rothkopf et al. |
| 10,610,157 B2 | 4/2020 | Pandya et al. |
| 10,613,685 B2 | 4/2020 | Shedletsky |
| 10,627,783 B2 | 4/2020 | Rothkopf et al. |
| 10,655,988 B2 | 5/2020 | Boonsom et al. |
| 10,664,074 B2 | 5/2020 | Moussette et al. |
| 10,732,571 B2 | 8/2020 | Ely et al. |
| 10,765,019 B2 | 9/2020 | Werner |
| 10,845,764 B2 | 11/2020 | Ely et al. |
| 10,852,700 B2 | 12/2020 | Abramov |
| 10,852,855 B2 | 12/2020 | Niu |
| 10,871,385 B2 | 12/2020 | Kok |
| 10,936,071 B2 | 3/2021 | Pandya et al. |
| 10,948,880 B2 | 3/2021 | Ely et al. |
| 10,962,930 B2 | 3/2021 | Ely et al. |
| 10,962,935 B1 | 3/2021 | Ely et al. |
| 10,987,054 B2 | 4/2021 | Pandya et al. |
| 11,000,193 B2 | 5/2021 | Tal et al. |
| 11,002,572 B2 | 5/2021 | Boonsom et al. |
| 11,029,831 B2 | 6/2021 | Block et al. |
| 11,036,318 B2 | 6/2021 | Bokma et al. |
| 11,148,292 B2 | 10/2021 | Bryner et al. |
| 11,194,298 B2 * | 12/2021 | Roach .................. G04G 21/025 |
| 11,194,299 B1 | 12/2021 | Taylor et al. |
| 11,347,189 B1 | 5/2022 | Herrera et al. |
| 11,350,869 B2 | 6/2022 | Rasmussen et al. |
| 11,360,440 B2 | 6/2022 | Perkins et al. |
| 11,474,483 B2 | 10/2022 | Rothkopf |
| 2002/0101457 A1 | 8/2002 | Lang |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0182708 A1 | 8/2007 | Poupyrev et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0247421 A1 | 10/2007 | Orsley et al. |
| 2008/0130914 A1 | 6/2008 | Cho |
| 2009/0051649 A1 | 2/2009 | Rondel |
| 2009/0073119 A1 | 3/2009 | Le et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Havrill |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie |
| 2014/0045547 A1 | 2/2014 | Singamsetty et al. |
| 2014/0071098 A1 | 3/2014 | You |
| 2014/0073486 A1 | 3/2014 | Ahmed et al. |

(56) References Cited

U.S. PATENT DOCUMENTS

| | | |
|---|---|---|
| 2014/0132516 A1 | 5/2014 | Tsai et al. |
| 2014/0197936 A1 | 7/2014 | Biggs et al. |
| 2014/0340318 A1 | 11/2014 | Stringer et al. |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0026647 A1 | 1/2015 | Park |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0293592 A1 | 10/2015 | Cheong |
| 2015/0320346 A1 | 11/2015 | Chen |
| 2015/0338642 A1 | 11/2015 | Sanford |
| 2015/0366098 A1 | 12/2015 | Lapetina et al. |
| 2016/0018846 A1 | 1/2016 | Zenoff |
| 2016/0054813 A1 | 2/2016 | Shediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253487 A1 | 9/2016 | Sarkar et al. |
| 2016/0306446 A1 | 10/2016 | Chung et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0090572 A1 | 3/2017 | Holenarsipur |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0059624 A1 | 3/2018 | James |
| 2018/0136686 A1 | 5/2018 | Jackson et al. |
| 2018/0196517 A1 | 7/2018 | Tan et al. |
| 2018/0225701 A1 | 8/2018 | Han |
| 2018/0235491 A1 | 8/2018 | Bayley et al. |
| 2018/0239306 A1* | 8/2018 | Ely ............... G05G 9/04 |
| 2018/0246469 A1* | 8/2018 | Ely ............... H01H 9/16 |
| 2018/0337551 A1 | 11/2018 | Park |
| 2019/0025940 A1 | 1/2019 | Shim et al. |
| 2019/0056700 A1 | 2/2019 | Matsuno |
| 2019/0072911 A1 | 3/2019 | Ely et al. |
| 2019/0072912 A1 | 3/2019 | Pandya et al. |
| 2019/0082547 A1 | 3/2019 | Werner et al. |
| 2019/0088583 A1 | 3/2019 | Ashikaga et al. |
| 2019/0278232 A1 | 9/2019 | Ely et al. |
| 2019/0317454 A1 | 10/2019 | Holenarsipur et al. |
| 2019/0391539 A1 | 12/2019 | Perkins et al. |
| 2020/0041962 A1 | 2/2020 | Beyhs |
| 2020/0064774 A1 | 2/2020 | Ely et al. |
| 2020/0064779 A1 | 2/2020 | Pandya et al. |
| 2020/0073339 A1 | 3/2020 | Roach et al. |
| 2020/0110473 A1 | 4/2020 | Bushnell et al. |
| 2020/0159172 A1 | 5/2020 | Bushnell et al. |
| 2020/0233380 A1 | 7/2020 | Rothkopf |
| 2020/0233529 A1 | 7/2020 | Shedletsky et al. |
| 2020/0310609 A1 | 10/2020 | Ham |
| 2021/0055696 A1 | 2/2021 | Ely |
| 2021/0060783 A1 | 3/2021 | Bryner et al. |
| 2021/0096688 A1 | 4/2021 | Shedletsky et al. |
| 2021/0181682 A1 | 6/2021 | Ely et al. |
| 2021/0181688 A1 | 6/2021 | Ely et al. |
| 2021/0181690 A1 | 6/2021 | Rothkopf et al. |
| 2021/0181691 A1 | 6/2021 | Rothkopf et al. |
| 2021/0181692 A1 | 6/2021 | Rothkopf et al. |
| 2021/0181865 A1 | 6/2021 | Bushnell et al. |
| 2021/0255590 A1 | 8/2021 | Ely et al. |
| 2021/0303081 A1 | 9/2021 | Kuboyama et al. |
| 2021/0353226 A1 | 11/2021 | Hiemstra |
| 2021/0405594 A1 | 12/2021 | Holenarsipur et al. |
| 2022/0043397 A1 | 2/2022 | Ely et al. |
| 2022/0075328 A1 | 3/2022 | Taylor |
| 2022/0171344 A1 | 6/2022 | Rothkopf et al. |
| 2022/0261111 A1 | 8/2022 | Shedletsky et al. |
| 2022/0299944 A1 | 9/2022 | Ely |
| 2022/0326660 A1 | 10/2022 | Perkins |
| 2022/0413446 A1 | 12/2022 | Rothkopf |
| 2023/0012897 A1 | 1/2023 | Bushnell |
| 2023/0013283 A1 | 1/2023 | Herrera |
| 2023/0028554 A1 | 1/2023 | Rothkopf |
| 2023/0077241 A1 | 3/2023 | Pandya et al. |
| 2023/0097827 A1 | 3/2023 | Rothkopf |
| 2023/0101015 A1 | 3/2023 | Ely |

FOREIGN PATENT DOCUMENTS

| | | |
|---|---|---|
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103919536 | 7/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |

(56) References Cited

FOREIGN PATENT DOCUMENTS

| | | |
|---|---|---|
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105547146 | 5/2016 |
| CN | 105556433 | 5/2016 |
| CN | 105683876 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| CN | 209625187 | 11/2019 |
| CN | 114220694 | 3/2022 |
| CN | 106125968 | 11/2022 |
| DE | 3706194 | 9/1988 |
| DE | 102008023651 | 11/2009 |
| DE | 102016215087 | 3/2017 |
| EP | 0165548 | 12/1985 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 2433211 | 6/2007 |
| JP | S52151058 | 12/1977 |
| JP | S52164551 | 12/1977 |
| JP | S53093067 | 8/1978 |
| JP | S54087779 | 6/1979 |
| JP | S5708582 | 1/1982 |
| JP | S5734457 | 2/1982 |
| JP | S60103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H0914941 | 1/1997 |
| JP | H10161811 | 6/1998 |
| JP | H11121210 | 4/1999 |
| JP | H11191508 | 7/1999 |
| JP | 2000258559 | 9/2000 |
| JP | 2000316824 | 11/2000 |
| JP | 2000337892 | 12/2000 |
| JP | 2001084934 | 3/2001 |
| JP | 2001167651 | 6/2001 |
| JP | 2001202178 | 7/2001 |
| JP | 2001215288 | 8/2001 |
| JP | 2001524206 | 11/2001 |
| JP | 2002071480 | 3/2002 |
| JP | 2002165768 | 6/2002 |
| JP | 2003050668 | 2/2003 |
| JP | 2003151410 | 5/2003 |
| JP | 2003331693 | 11/2003 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2014174031 | 9/2014 |
| JP | 2017219448 | 12/2017 |
| JP | 2018510451 | 4/2018 |
| KR | 20010030477 | 4/2001 |
| KR | 200278568 | 3/2002 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 2020100007563 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |
| KR | 20170106395 | 9/2017 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2003/032538 | 4/2003 |
| WO | WG2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/147756 | 10/2015 |
| WO | WO2016080669 | 5/2016 |
| WO | WO2016/104922 | 6/2016 |
| WO | WO2016155761 | 10/2016 |
| WO | WO2016196171 | 12/2016 |

(56) References Cited

FOREIGN PATENT DOCUMENTS

| WO | WO2016208835 | 12/2016 |
|---|---|---|
| WO | WO2017013278 | 1/2017 |
| WO | WO2020173085 | 9/2020 |

OTHER PUBLICATIONS

Author Unknown, "Fossil Q ups smartwatch game with handsome design and build," Business Mirror, Makati City, Philippines, 3 pages, Dec. 20, 2016.
Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.
Author Unknown, "mHealth," http://mhealth.vesag.com/?m=201012, 7 pages, Dec. 23, 2010.
Author Unknown, "mHealth Summit 2010," http://www.virtualpressoffice.com/eventsSubmenu.do?page=exhibitorPage&showId=1551&companyId=5394, 5 pages, Nov. 18, 2010.
Author Unknown, "MyKronoz ZeTime: World's Most Funded Hybrid Smartwatch Raised over $3M on Kickstarter, Running until Apr. 27," Business Wire, New York, New York, 3 pages, Apr. 21, 2017.
Author Unknown, "RedEye mini Plug-in Universal Remote Adapter for iPhone, iPod touch and iPad," Amazon.com, 4 pages, date unknown.
Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.
Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.
Author Unknown, "Vyzin Electronics Private Limited launches Vesag Watch," http://www.virtualpressoffice.com/showJointPage.do?page=jp&showId=1544, 5 pages, Jan. 6, 2011.
Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
Author Unknown, "DeskThorityNet, Optical Switch Keyboards," http://deskthority.net/keyboards-f2/optical-switch-keyboards-t1474.html, 22 pages, Jul. 11, 2015.
Epstein et al., "Economical, High-Performance Optical Encoders," Hewlett-Packard Journal, pp. 99-106, Oct. 1988. [text only version].
GreyB, "Google Watch: Convert your arm into a keyboard," http://www.whatafuture.com/2014/02/28/google-smartwatch/#sthash.Yk35cDXK.dpbs, 3 pages, Feb. 28, 2014.
IBM, "Additional Functionality Added to Cell Phone via "Learning" Function Button," www.ip.com, 2 pages, Feb. 21, 2007.
Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.
Krishnan et al., "A Miniature Surface Mount Reflective Optical Shaft Encoder," Hewlett-Packard Journal, Article 8, pp. 1-6, Dec. 1996.
Rick, "How Vesag Helps Health Conscious Citizens," http://sensetekgroup.com/2010/11/29/wireless-health-monitoring-system/, 2 pages, Nov. 29, 2010.
Sadhu, Rajendra, "How Vesag Helps People Who Want to 'Be There'?," http://ezinearticles.com/?How-Vesag-Helps-People-Who-Want-to-Be-There?&id=5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.
Narayanaswami et al., "Challenges and considerations for the design and production of a purpose-optimized body-worn wristwatch computer," Defense, Security, and Cockpit Displays, 2004.
M.T. Raghunath et al., User Interfaces for Applications on a Wrist Watch, Personal and Ubiquitous Computing, vol. 6, No. 1, 2002, Springer.

\* cited by examiner

CROWN ASSEMBLY FOR AN ELECTRONIC WATCH

CROSS-REFERENCE TO RELATED APPLICATIONS

This application is a continuation patent application of U.S. patent application Ser. No. 16/215,607, filed Dec. 10, 2018, and titled "Crown Assembly for an Electronic Watch," which claims the benefit under 35 U.S.C. § 119 of U.S. Provisional Patent Application No. 62/725,239, filed on Aug. 30, 2018, and entitled "Crown Assembly for an Electronic Watch," the contents of which are incorporated by reference in their entirety.

FIELD

The described embodiments relate generally to electronic devices, and more particularly to a crown for a wearable electronic device.

BACKGROUND

Electronic devices frequently use physical input devices to facilitate user interaction. For example, buttons, keys, dials, and the like can be physically manipulated by users to control operations of the device. Physical input devices may use various types of sensing mechanisms to translate the physical manipulation to signals usable by the electronic device. For example, buttons and keys may use collapsible dome switches to detect presses, while dials and other rotating input devices may use encoders or resolvers to detect rotational movements.

SUMMARY

An electronic watch may include a housing defining a side wall having a through-hole and a crown assembly including an actuation member. The actuation member may include a crown shaft extending through the through-hole and having an exterior portion defining an input surface and a crown ring coupled to the exterior portion of the crown shaft and electrically isolated from the crown shaft. The crown assembly may further include an optical encoder component attached to the actuation member and defining a group of optical features. The electronic watch may further include an optical detector configured to detect rotation of the crown assembly by detecting motion of the group of optical features and an electrocardiograph sensor comprising a sensing component. The sensing component may be conductively coupled to the actuation member via a conductive path at least partially defined by the crown shaft.

The electronic watch may further include a switch configured to be actuated by the crown assembly in response to an axial input applied to the crown assembly, a friction guard having a shear plate positioned between the switch and the optical encoder component and conductively coupled to the optical encoder component, and a bracket comprising a body structure and a conductor coupled to the body structure. The conductive path may be further defined by the optical encoder component and the conductor and may be configured to carry electrical signals from a user in contact with the input surface to the electrocardiograph sensor. The body structure may include a polymer material, and the conductor may be at least partially encapsulated by the polymer material.

The electronic watch may further include a switch configured to be actuated by the crown assembly in response to an axial force applied to the crown assembly, and a friction guard at least partially positioned between the switch and the optical encoder component and conductively coupled to the optical encoder component. The axial force may be transferred from the crown assembly to the switch through the friction guard, and the conductive path may be further defined by the friction guard. The crown assembly may be rotatable relative to the housing, the crown assembly may rotate against the friction guard when the crown assembly is rotated, and the friction guard may protect the switch from rotational friction from the crown assembly.

The electronic watch may further include, within an internal volume of the housing, a bracket, a frame coupled to the bracket and attached to the housing, and a wear plate positioned between an inner surface of the frame and configured to electrically isolate the optical encoder component from the frame.

The electronic watch may further include a display positioned at least partially within the housing and configured to display a graphical output, a transparent cover coupled to the housing, and a touch sensor positioned below the transparent cover and configured to detect touch inputs applied to the transparent cover, and the electronic watch may be configured to modify the graphical output in accordance with a detected rotation of the crown assembly.

An electronic watch may include a housing at least partially defining an internal volume, biometric sensing circuitry within the internal volume, and a crown assembly configured to rotate and translate relative to the housing. The crown assembly may include a crown shaft defining an axial end surface, a crown ring coupled to the crown shaft and defining a series of tactile features arranged around a circumference of the crown ring, and an optical encoder component attached to the crown shaft and defining a group of optical features. The crown shaft and the optical encoder component may define a conductive path configured to conductively couple the crown assembly to the biometric sensing circuitry. The biometric sensing circuitry may be part of an electrocardiograph sensor.

The electronic watch may further include a switch and a friction guard having a shear plate positioned between the crown assembly and the switch and configured to transfer axial forces from the crown assembly to the switch. The electronic watch may further include a bracket positioned in the internal volume and comprising a metal flange, a polymer body structure, and a conductor coupled to the polymer body structure and electrically isolated from the metal flange by the polymer body structure. The friction guard may be in contact with the conductor, and the conductive path may be further defined by the friction guard and the conductor. The electronic watch may further include a conductive lubricant at an interface between the crown assembly and the friction guard.

The optical encoder component may be attached to the crown shaft via a threaded connection. The axial end surface of the crown shaft may define an input surface for the biometric sensing circuitry.

An electronic device may include a housing at least partially defining an internal volume, an electrocardiograph sensor within the internal volume and comprising a sensing component, a frame within the internal volume and attached to the housing, and a bracket attached to the frame. The bracket may include a body structure and a conductor at least partially encapsulated in the body structure. The electronic device may also include a crown assembly having an external portion positioned outside of the internal volume and configured to rotate and translate relative to the housing. The bracket and the frame may at least partially enclose a portion of the crown assembly, and the crown assembly and the conductor may define a conductive path configured to conductively couple the sensing component to an object in contact with the external portion of the crown assembly.

The electronic device may further include a band coupled to the housing, a display at least partially within the internal volume of the housing, a transparent cover coupled to the housing and positioned such that the display is visible through the transparent cover, and a touch sensor at least partially within the internal volume and configured to detect touch inputs applied to the transparent cover.

The crown assembly may include a crown shaft having an internal portion within the internal volume and an optical encoder component attached to the internal portion of the crown shaft and defining a group of optical features. The electronic device may further include an optical detector configured to detect rotation of the crown assembly by detecting motion of the group of optical features, and the optical encoder component may define part of the conductive path.

The electronic device may include a friction guard in contact with the bracket and the crown assembly and a switch positioned between the friction guard and the bracket and configured to be actuated in response to axial translation of the crown assembly. The friction guard may include a shear plate and a support leg configured to allow the shear plate to deflect relative to the bracket. The friction guard may be a single piece of conductive material.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
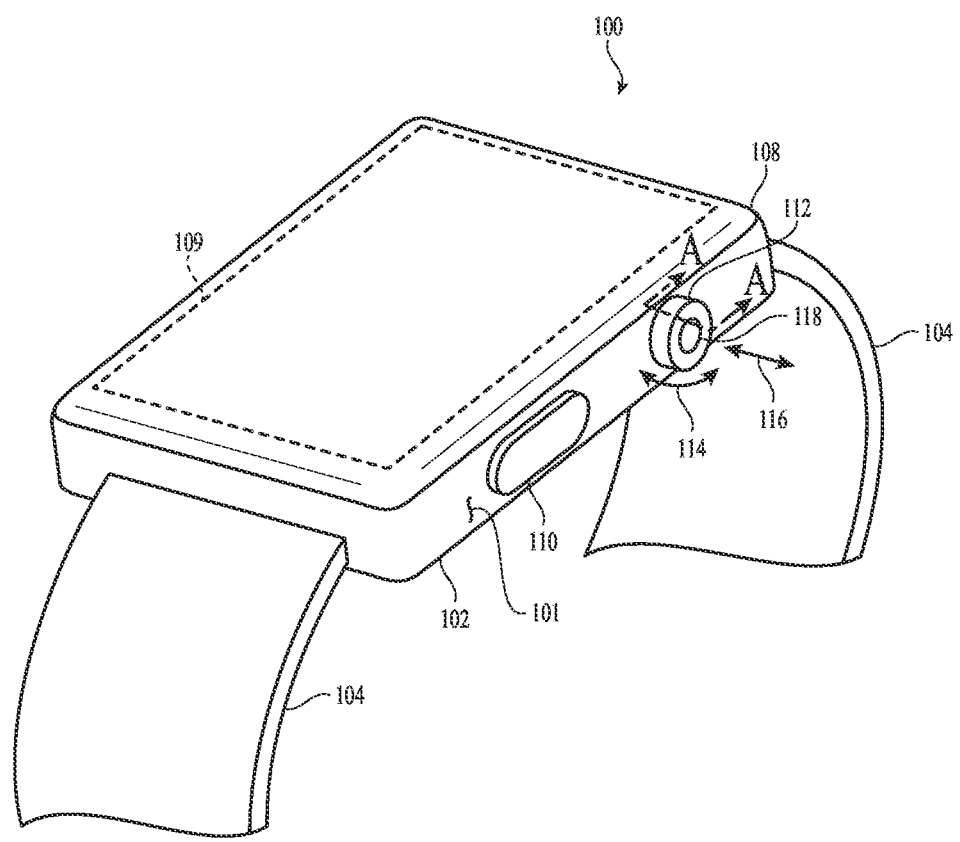
FIG. 1 depicts an example wearable electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a crown of a wearable electronic device, such as an electronic watch (also referred to as a "smart watch" or simply a "watch"), and more particularly to a crown that acts as a contact point for a sensor, such as a biometric sensor, of the watch. For example, a smart watch may include a heart rate sensor, an electrocardiograph sensor, a thermometer, a photoplethysmograph sensor, a fingerprint sensor, or the like, all of which are examples of biometric sensors that measure or detect some aspect of a user's body. Such sensors may require direct contact with the user's body, such as via a finger. Accordingly, a device may include an external button, window, electrode, or other input feature or surface that a user may touch in order to allow the sensor to take a reading or measurement.

In some cases, the portion of the sensor that a user contacts to provide input to the sensor may be integrated with another input system of the watch. For example, as described herein, a watch may include a crown that accepts one or more types of inputs, such as rotational inputs (e.g., twisting, turning, or spinning the crown) and/or translational inputs (e.g., pressing axially on the crown). Such inputs may allow the user to provide inputs to the watch, such as to interact with a graphical user interface (e.g., by modifying a graphical output of a display in accordance with a direction of rotation of the crown), setting the time, or the like. In some cases, the crown itself, or a portion thereof, may also define an input surface for providing inputs to biometric sensing circuitry of a biometric sensor. This may provide several advantages. For example, because the crown is a familiar input mechanism for a watch, users will be familiar with providing inputs using the crown. Further, assuming the user has provided appropriate permissions, biometric sensing may be performed while the user is providing other types of inputs to the device.

In some cases, a biometric sensor may need to conductively couple to a user's body in order to function. For example, a heart rate monitor, electrocardiograph sensor, fingerprint sensor, or the like may need to conductively couple to the user's body (e.g., via a finger) in order to measure or detect the user's heart rate, heart rhythm, or other biometric information or data. Accordingly, in order to provide input to biometric sensing circuitry via a crown, a conductive path may be formed through the crown and into the watch housing. In this way, the user may simply contact the crown (or a portion thereof) in order to provide an input to the biometric sensor. Forming a conductive path through the crown may be difficult, however, because crowns may include numerous intricate components to facilitate the detection of rotational and axial inputs, and because it may be necessary or desirable to electrically isolate the crown so that it is not conductively coupled to the housing or another grounded component (which may reduce or destroy the effectiveness of the crown as an input feature.

As described herein, a conductive path may be formed through multiple components of a crown input system, while preventing the crown from being grounded by a housing or internal structure of the electronic watch. For example, a rotatable component of a crown may be formed of a conductive material. An end of the rotatable component, such as the end of a shaft, may contact a friction guard or other physical shield within the watch. In some cases, as described herein, the rotatable component is coupled to or includes an optical encoder component (e.g., a component of an optical encoder), such as a barrel that defines reflective features and also is formed of or includes a conductive material. Where an optical component is included, the optical component may contact the friction guard instead of or in addition to the shaft. The friction guard may prevent friction from the rotating component from damaging other internal components of the input system (such as a switch). The friction guard may also be formed of or include a conductive material. Because the rotatable component and the friction guard are in direct contact with one another and are each formed from or include conducive materials, these components may define at least part of a conductive path through the crown input system. This conductive path may conductively couple the user's finger to biometric sensing circuitry of a biometric sensor (while also isolating the conductive path from other conductive components such as a housing), thus allowing the crown to act as an input member not only for rotational and translational inputs, but also for the biometric sensor. Accordingly, the crown (or portions thereof) may be considered part of a biometric sensor, along with biometric sensing circuitry and/or other components.

As described herein, a crown input system may include structural components such as brackets, shrouds, frames, and the like, which may be formed of or include conductive materials and which may be secured to other conductive components, such as a metal housing. These components may form an internal enclosure that at least partially encloses or surrounds a rotatable component of the crown input system. In order to provide a conductive path that is not grounded to or otherwise conductively coupled to components that would have a deleterious effect on the operation of the biometric sensor, the crown input system may provide a conductive path through the structural components. For example, a conductor may be at least partially encapsulated in a polymer material of a bracket and provide an internal contact area (e.g., within the internal enclosure) that contacts the friction guard, and an external contact area (e.g., accessible via an outer surface of the internal enclosure) that is coupled to biometric sensing circuitry. The polymer material may electrically insulate or isolate the conductor so that the conductive path through the rotatable component and the friction guard can be passed through the enclosure without being grounded to the housing of the watch.

FIG. 1 depicts an electronic device 100. The electronic device 100 is depicted as a watch, though this is merely one example embodiment of an electronic device, and the concepts discussed herein may apply equally or by analogy to other electronic devices, including mobile phones (e.g., smartphones), tablet computers, notebook computers, head-mounted displays, digital media players (e.g., mp3 players), or the like.

The electronic device 100 includes a housing 102 and a band 104 coupled to the housing. The housing 102 may at least partially define an internal volume in which components of the device 100 may be positioned. The band 104 may be configured to attach the electronic device 100 to a user, such as to the user's arm or wrist.

The electronic device 100 also includes a transparent cover 108 coupled to the housing 102. The cover 108 may define a front face of the electronic device 100. For example, in some cases, the cover 108 defines substantially the entire front face and/or front surface of the electronic device. The cover 108 may also define an input surface of the device 100. For example, as described herein, the device 100 may include touch and/or force sensors that detect inputs applied to the cover 108. The cover may be formed from or include glass, sapphire, a polymer, a dielectric, or any other suitable material.

The cover 108 may overlie at least part of a display 109 that is positioned at least partially within the internal volume of the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid crystal display (LCD), organic light emitting diode display (OLED), or any other suitable components or display technologies.

The display 109 may include or be associated with touch sensors and/or force sensors that extend along the output region of the display and which may use any suitable sensing elements and/or sensing systems and/or techniques. Using touch sensors, the device 100 may detect touch inputs applied to the cover 108, including detecting locations of touch inputs, motions of touch inputs (e.g., the speed, direction, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Further, as described herein, the touch and/or force sensors may detect motion of an object (e.g., a user's finger) as it is interacting with a crown 112 of the electronic device 100. Touch and/or force sensors usable with wearable electronic devices, such as the device 100, are described herein with respect to FIG. 5.

The electronic device 100 also includes a crown 112 (also referred to herein as a crown assembly) having a knob, external portion, or component(s) or feature(s) positioned along a side wall 101 of the housing 102. At least a portion of the crown 112 (e.g., a knob 208, FIG. 2) may protrude from the housing 102, and may define a generally circular shape or a circular exterior surface. The exterior surface of the crown 112 (or a portion thereof) may be textured, knurled, grooved, or may otherwise have features that may improve the tactile feel of the crown 112 and/or facilitate rotation sensing. At least a portion of the exterior surface of the crown 112 may also be conductively coupled to biometric sensing circuitry (or circuitry of another sensor that uses a conductive path to an exterior surface), as described herein.

The crown 112 may facilitate a variety of potential user interactions. For example, the crown 112 may be rotated by a user (e.g., the crown may receive rotational inputs). The arrow 114 in FIG. 1 illustrates example direction(s) of rotational inputs to the crown 112. Rotational inputs to the crown 112 may zoom, scroll, rotate, or otherwise manipulate a user interface or other object displayed on the display 109 (among other possible functions). The crown 112 may also be translated or pressed (e.g., axially) by the user, as indicated by arrow 116. Translational or axial inputs may select highlighted objects or icons, cause a user interface to return to a previous menu or display, or activate or deactivate functions (among other possible functions). In some cases, the device 100 may sense touch inputs or gestures applied to the crown 112, such as a finger sliding along a surface of the crown 112 (which may occur when the crown 112 is configured to not rotate relative to the housing 102) or a finger touching an end face of the crown 112. In such cases, sliding gestures may cause operations similar to the rotational inputs, and touches on an end face may cause operations similar to the translational inputs. As used herein, rotational inputs may include both rotational movements of the crown (e.g., where the crown is free to rotate), as well as sliding inputs that are produced when a user slides a finger or object along the surface of a crown in a manner that resembles a rotation (e.g., where the crown is fixed and/or does not freely rotate).

The crown 112 may also include or define an input feature 118 that facilitates input to biometric sensing circuitry or other sensing circuitry within the device 100. The input feature 118 may be a conductive surface that is conductively coupled, via one or more components of the device 100, to the biometric sensing circuitry. In some cases, the input feature 118 and/or the component(s) that define the input feature 118 are electrically isolated from other components of the device 100. For example, the input feature 118 may be electrically isolated from the housing 102. In this way, the conductive path from the input feature 118 to the biometric sensing circuitry may be isolated from other components that may otherwise reduce the effectiveness of the biometric sensor.

Figure 4:
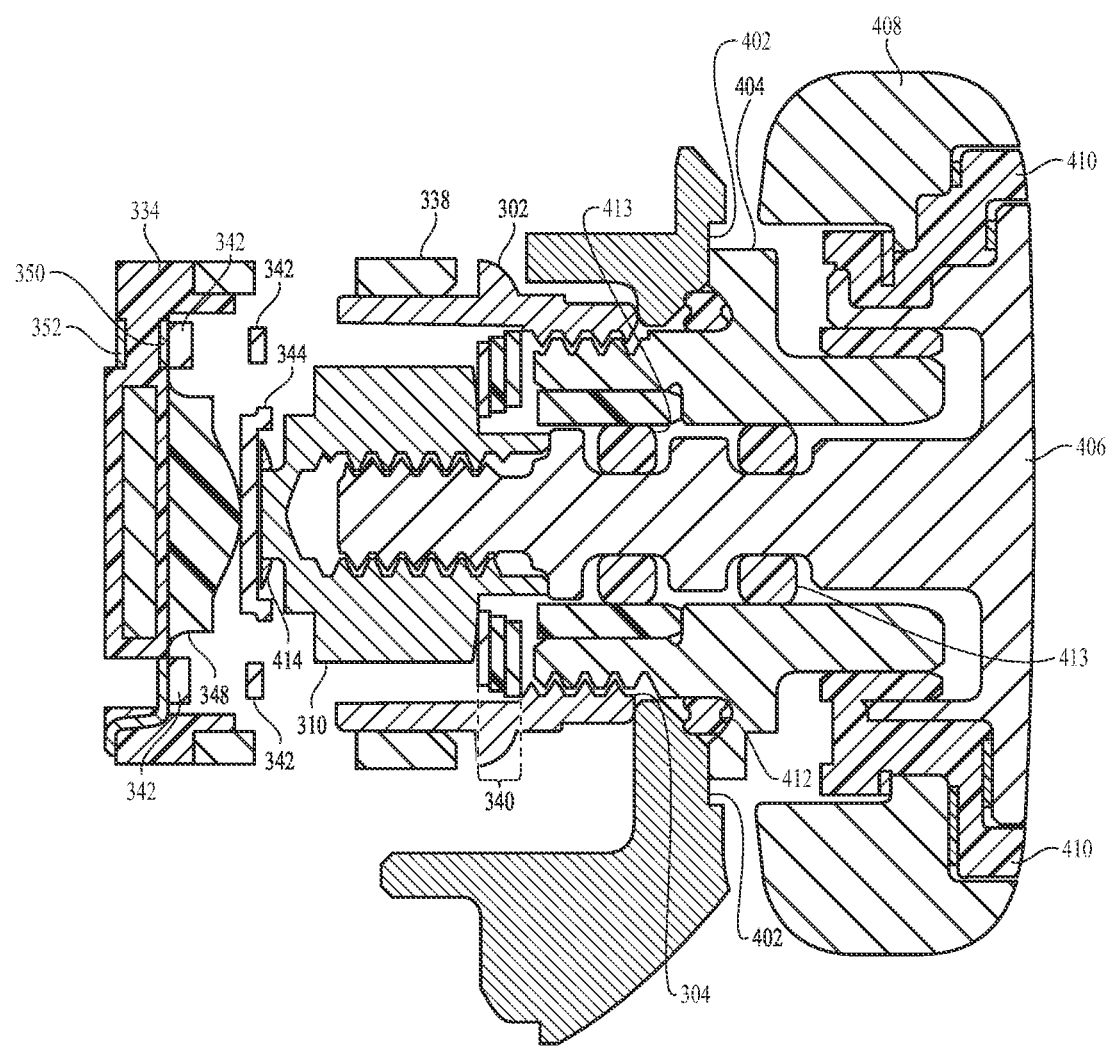
FIG. 4 depicts a cross-sectional view of an input system for a wearable electronic device.

The input feature 118 may be an exterior surface of a component of a crown assembly, such as an exterior portion of a crown shaft (e.g., an exterior surface of the crown shaft 406, FIG. 4). In order to provide an input to the biometric sensor, a user may place a finger or other body part on the input feature 118. The biometric sensor may be configured to take a reading or measurement in response to detecting that the user has placed a finger or other body part on the input feature 118. In some cases, the biometric sensor may only take a reading or measurement when a sensing function is separately initiated by a user (e.g., by activating the function via a graphical user interface). In other cases, a reading or measurement is taken any time the user contacts the input feature 118 (e.g., to provide a rotational or translational input to the crown 112). The user may have full control over when the biometric sensor takes measurements or readings, and may even have the option to turn off the biometric sensing functionality entirely.

The device 100 may also include one or more haptic actuators that are configured to produce a tactile output through the crown 112. For example, the haptic actuator may be coupled to the crown 112 and may be configured to impart a force to the crown 112. The force may cause the crown 112 to move (e.g., to oscillate or vibrate translationally and/or rotationally, or to otherwise move to produce a tactile output), which may be detectable by a user when the user is contacting the crown 112. The haptic actuator may produce tactile output by moving the crown 112 in any suitable way. For example, the crown 112 (or a component thereof) may be rotated (e.g., rotated in a single direction, rotationally oscillated, or the like), translated (e.g., moved along a single axis), or pivoted (e.g., rocked about a pivot point). In other cases, the haptic actuator may produce tactile outputs using other techniques, such as by imparting a force to the housing 102 (e.g., to produce an oscillation, vibration, impulse, or other motion), which may be perceptible to a user through the crown 112 and/or through other surfaces of the device 100, such as the cover 108, the housing 102, or the like. Any suitable type of haptic actuator and/or technique for producing tactile output may be used to produce these or other types of tactile outputs, including electrostatics, piezoelectric actuators, oscillating or rotating masses, ultrasonic actuators, reluctance force actuators, voice coil motors, Lorentz force actuators, or the like.

Tactile outputs may be used for various purposes. For example, tactile outputs may be produced when a user presses the crown 112 (e.g., applies an axial force to the crown 112) to indicate that the device 100 has registered the press as an input to the device 100. As another example, tactile outputs may be used to provide feedback when the device 100 detects a rotation of the crown 112 or a gesture being applied to the crown 112. For example, a tactile output may produce a repetitive "click" sensation as the user rotates the crown 112 or applies a gesture to the crown 112. Tactile outputs may be used for other purposes as well.

The electronic device 100 may also include other inputs, switches, buttons, or the like. For example, the electronic device 100 includes a button 110. The button 110 may be a movable button (as depicted) or a touch-sensitive region of the housing 102. The button 110 may control various aspects of the electronic device 100. For example, the button 110 may be used to select icons, items, or other objects displayed on the display 109, to activate or deactivate functions (e.g., to silence an alarm or alert), or the like.

Figure 2:
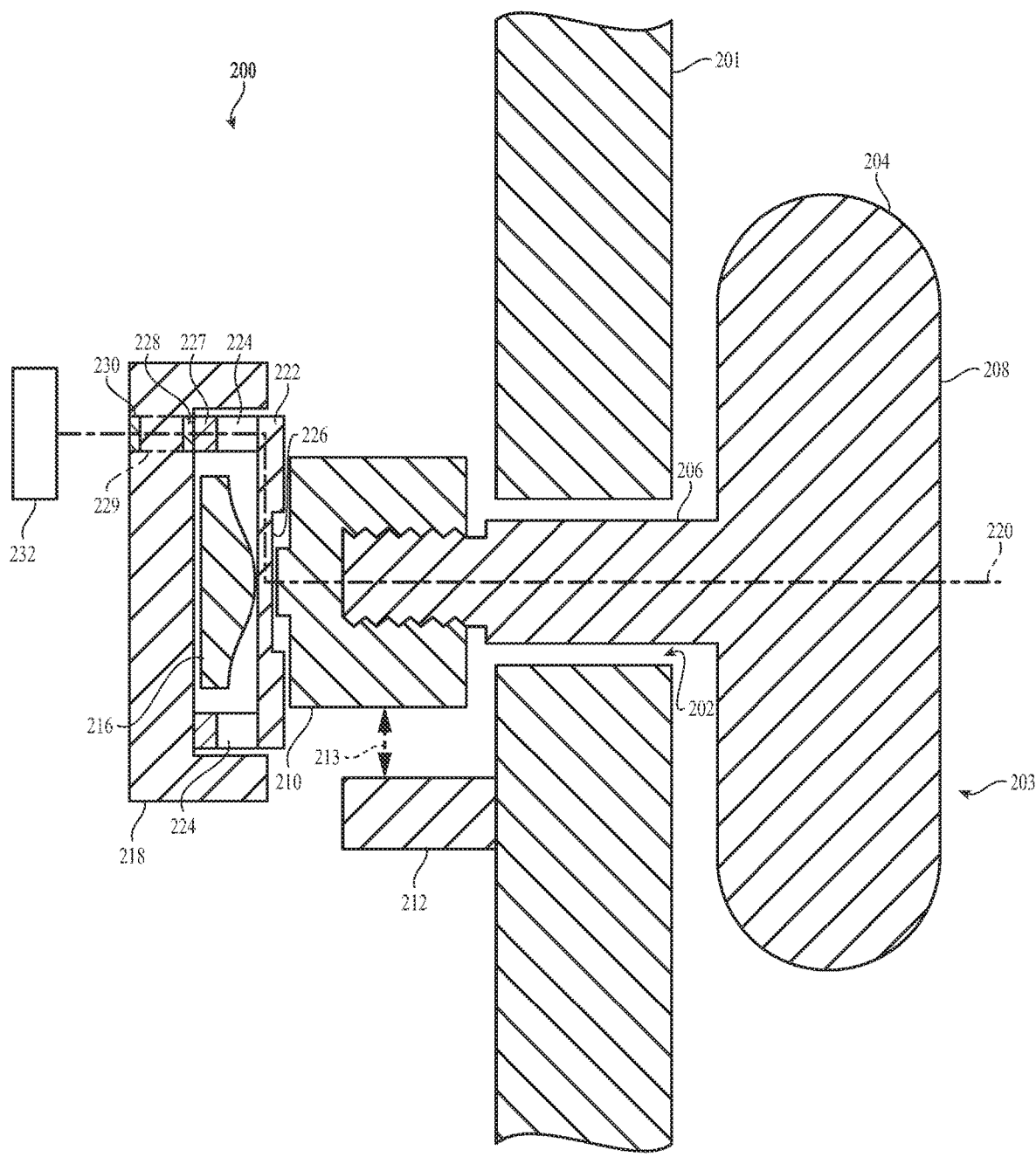
FIG. 2 depicts a schematic cross-sectional view of a portion of a wearable electronic device.

FIG. 2 depicts a partial cross-sectional view of an example electronic device 200 having an input system in which a conductive path 220 is defined through a crown assembly 203, as well as other components of the input system. For example, the conductive path 220 extends through the crown assembly 203, through a friction guard 222, through a bracket 218 via an embedded conductor 229, and to biometric sensing circuitry 232.

The input system shown in FIG. 2 uses the friction guard 222 to define part of the conductive path 220 while also allowing the crown assembly 203 to rotate and translate to accept rotational and translational inputs. The friction guard 222 also protects a switch 216 (which may detect axial inputs) from damage due to the rotation and translation of the crown. Thus, the crown input system defines a sufficiently isolated electrical path through the crown input system while also facilitating numerous other input functions and providing a robust and durable system.

The device 200 may be an embodiment of the device 100, and may include the same or similar components and may provide the same or similar functions as the device 100. Accordingly, details of the device 100 described above may apply to the device 200, and for brevity will not be repeated here.

As used herein, an "input system" may refer to and/or include mechanisms, systems, components, circuitry, and/or other components that together provide one or more input functions to a device. For example, the input system shown and described with respect to FIG. 2 (which may also be referred to as a crown input system) may include components such as an actuation member 204, an optical detector 212, a bracket 218, biometric sensing circuitry 232, an optical encoder component 210, a switch 216, a friction guard 222, and the like.

The device 200 includes a housing that defines a side wall 201 (e.g., which may correspond to the side wall 101, FIG. 1). The side wall 201 defines a through-hole 202, and an actuation member 204 may extend through the through-hole 202. The actuation member 204 may be a component of a crown assembly that extends through the housing and has a portion that is inside the housing and another portion that is outside the housing. The actuation member 204 defines a crown shaft 206 (at least a portion of which is inside the housing) and a knob 208 (at least a portion of which defines an exterior portion of the shaft that is outside the housing). As shown, the crown shaft 206 and the knob 208 may be formed as a unitary structure, though other actuation members may have different components and/or configurations, and may be defined by several different components that are attached together. The actuation member 204 may be formed from or include a conductive material (e.g., metal, carbon fiber, conductive polymer, conductive ceramics, or the like). Accordingly, an exterior surface of the actuation member 204 (e.g., the portion of the actuation member 204 that is outside of the device housing and is contactable by a user), and optionally other surfaces of the actuation member 204, form an input surface for a biometric sensor. More particularly, the electrical conductivity of the exterior surface facilitates a conductive path from a user's finger in contact with the actuation member 204.

The crown assembly 203 also includes an optical encoder component 210 (e.g., a barrel, sleeve, cylinder, or other component) attached to the actuation member 204. The optical encoder component 210 may be fixed to the actuation member 204 in such a way that the optical encoder component 210 moves with the actuation member 204. More particularly, when the actuation member 204 is rotated, the optical encoder component 210 rotates as well, and when the actuation member 204 is translated (e.g., axially, as a result of an axial input force), the optical encoder component 210 translates as well. While the crown assembly 203 shows the optical encoder component 210 as a barrel-shaped component, a different type or configuration of optical encoder component may be used, such as a sleeve, a cylinder, a nut, a splined component, a group of reflective members defining multiple facets, or the like.

The optical encoder component 210 may be a component of an optical encoder that determines one or more properties of a rotational input applied to the crown assembly 203. For example, the optical encoder component 210 define a group of optical features along an outer surface of the optical encoder component 210, and an optical detector 212 (which may also be considered a component of the optical encoder) may be configured to detect rotation of the crown assembly 203 by detecting motion of the group of optical features (via an optical path represented by arrow 213). In some cases, the optical detector 212 may include or may be associated with a light source or optical emitter that directs light (e.g., infrared light, laser light, visible light, or any other suitable radiation type) onto the outer surface of the optical encoder component 210, which may reflect the light onto the optical detector 212. The optical detector 212 may determine a property of motion of the crown assembly 203 based on the detected reflected light, such as a speed and/or direction of the motion of the crown assembly 203.

The optical features on the optical encoder component 210 may be any suitable features, such as grooves (e.g., parallel to the axis of the crown shaft 206), prisms, concave features, facets, threads, scratches, splines, recesses, or the like. The optical features may be arranged in an evenly spaced pattern around the optical encoder component 210 (e.g., the features may be separated by substantially a same distance). The regular arrangement may aid in the operation of the optical detector 212 and allow the optical detector 212 to determine properties of the motion and/or position of the crown assembly 203 (e.g., speed, direction, position, acceleration, or the like). In some cases, the optical features are not arranged in an evenly spaced pattern, but instead are arranged in an irregular pattern, a random pattern, or the like.

The optical encoder component 210 may be attached to the actuation member 204 in any suitable way, including a threaded connection (as shown in FIG. 2), adhesive, mechanical interlock structures, fasteners, pins, or the like. The optical encoder component 210 may be conductively coupled to the actuation member 204 to further define the conductive path 220 that conductively couples a user to a biometric (or other) sensing component 232. The optical encoder component 210 may be conductively coupled to the actuation member 204 via the threads, as shown, and/or via other conductive couplings (e.g., a wire or other conductive component that is conductively coupled to both the optical encoder component 210 and the actuation member 204).

In some cases the optical encoder component 210 may be omitted. In such cases the actuation member 204 itself may include optical features such as those described above as being on the optical encoder component 210, and the optical detector 212 may determine properties of the motion and/or position of the crown assembly 203 by directly sensing or detecting the optical features on the actuation member 204.

As noted above, the crown assembly 203 (which includes the actuation member 204 and the optical encoder component 210) may be translatable along an axis of the crown assembly 203 to provide an input to the device 200. In order to detect the axial input, the device 200 may include a switch 216 positioned between a bracket 218 and an end of the crown assembly 203. The switch 216 may be a dome switch, which may provide electrical switching functionality (e.g., closing a circuit upon actuation by the crown assembly 203) as well as a tactile output that may be felt or otherwise perceived by the user. For example, the user may feel a click, detent, or other sensation upon the collapse of the dome switch, thus indicating to the user that an input has been successfully provided to the device 200. In some cases, other types of switches or force sensing components may be used to detect axial inputs, which may be positioned similarly to the switch 216 in FIG. 2.

When the crown assembly 203 is rotated to provide a rotational input, the end of the crown assembly 203 that applies a force to actuate the switch 216 may slide, scrape, or shear against surfaces that support or are otherwise in contact with the crown assembly 203. If the crown assembly 203 were in contact directly with the switch 216, for example, an end of the optical encoder component 210 would apply a shearing or rotational friction on the surface of the switch 216 (due to the optical encoder component 210 rotating against the stationary switch 216). This friction may cause damage to the switch 216 and/or the optical encoder component 210. In some cases a friction guard 222 (or a portion thereof) is positioned between the switch 216 and the optical encoder component 210 (or between the switch 216 and the actuation member 204 in implementations where the optical encoder component 210 is omitted). The portion of the friction guard 222 that is between the optical encoder component 210 and the switch 216 (or between the actuation member 204 and the switch 216 in implementations where the optical encoder component 210 is omitted) is referred to as a shear plate 226.

Axial forces from the crown assembly 203 may be transferred to the switch 216 through the friction guard 222. For example, the friction guard 222 may be flexible so that the portion of the friction guard 222 that is between the optical encoder component 210 and the switch 216 can translate in response to an axial force applied by the crown assembly 203 and apply a corresponding force onto the switch 216 to actuate the switch 216. Because the friction guard 222 does not rotate, however, any friction due to rotation of the crown assembly 203 is applied to the friction guard 222 and not to the switch 216. This may help extend the life of the switch 216 by preventing the friction from damaging the outer surface of the switch 216, for example.

In order to support the friction guard 222 and maintain it in a desired position, the friction guard 222 may define support legs 224 that contact the bracket 218 and maintain the shear plate 226 in a desired position. In some cases, the support legs 224 are flexible and act as springs that allow the shear plate 226 to deflect (relative to the bracket 218) in response to an axial force applied to the crown assembly, and then return the shear plate 226 to a neutral or rest position after the axial force is removed. In some cases, the support legs 224 may bias the shear plate 226 against the end of the optical encoder component 210. This may help maintain physical contact with the optical encoder component 210, which may help reduce wear on the shear plate 226 and the optical encoder component 210.

The friction guard 222 may also define part of the conductive path 220 that may conductively couple the user's finger to a sensing component 232 through the crown assembly 203. Accordingly, the friction guard 222 may be formed of or include a conductive material, such as metal, metal alloy, carbon fiber, conductive polymers, or the like. In some cases, the friction guard 222 is a single piece of metal that defines the shear plate 226 and the support legs 224. One or more of the support legs 224 may define a contact portion 227 that is conductively coupled to another conductor 229 in the bracket 218, as described herein. The spring function of the support legs 224 may help maintain physical contact between the contact portion 227 and a corresponding contact portion 228 of the conductor 229, as well as between the shear plate 226 and the optical encoder component 210. Accordingly, the conductive path 220 is maintained during both rotational and axial movements of the crown assembly 203, allowing the sensing component 232 to take readings and/or measurements despite incidental or intentional movements of the crown assembly 203. As described herein, in order to reduce electrical noise introduced into the conductive path 220 when the crown assembly 203 is rotated, a conductive lubricant (e.g., a conductive grease) may be applied at the interface between the end of the optical encoder component 210 and the shear plate 226.

The bracket 218 may define a structural support for one or more components of the device 200. For example, the bracket 218 may be attached to the housing to provide a stable mounting structure for the switch 216 and the friction guard 222. The bracket 218 may also include a conductor 229, which may define a contact portion 228 (which is in contact with the support leg 224 of the friction guard 222) and a contact portion 230 that is accessible via the outside of the bracket 218. The contact portion 230 may be conductively coupled to the sensing component 232 (e.g., by a conductive trace, wire, flexible circuit component, or the like), thus defining part of the conductive path 220 between the crown assembly 203 and the sensing component 232. The conductor 229 may be a piece of metal that is coupled to a polymer body structure 234 of the bracket 218. In some cases the conductor 229 is at least partially encapsulated in the body structure 234 (e.g., by insert molding).

As shown in FIG. 2, components such as the bracket 218, the optical encoder component 210, the friction guard 222, a portion of the actuation member 204, and the switch 216 may be positioned within the internal volume of the device. Another portion of the actuation member 204, such as the knob 208, may be positioned outside of the internal volume (e.g., it may be an external portion of the actuation member 204 that is on the side of the device and is accessible to a user).

The input system described with respect to FIG. 2 may be used to carry electrical signals from a user to a sensing component 232. The sensing component 232 may be a component of any suitable type of sensor, such as a heart rate sensor, electrocardiograph sensor, temperature sensor, or the like. In some cases, the sensing component 232 may be coupled to or associated with other components that together form a sensor or sensing system, such as a processor, circuitry, a power source, or the like.

Figure 3A:
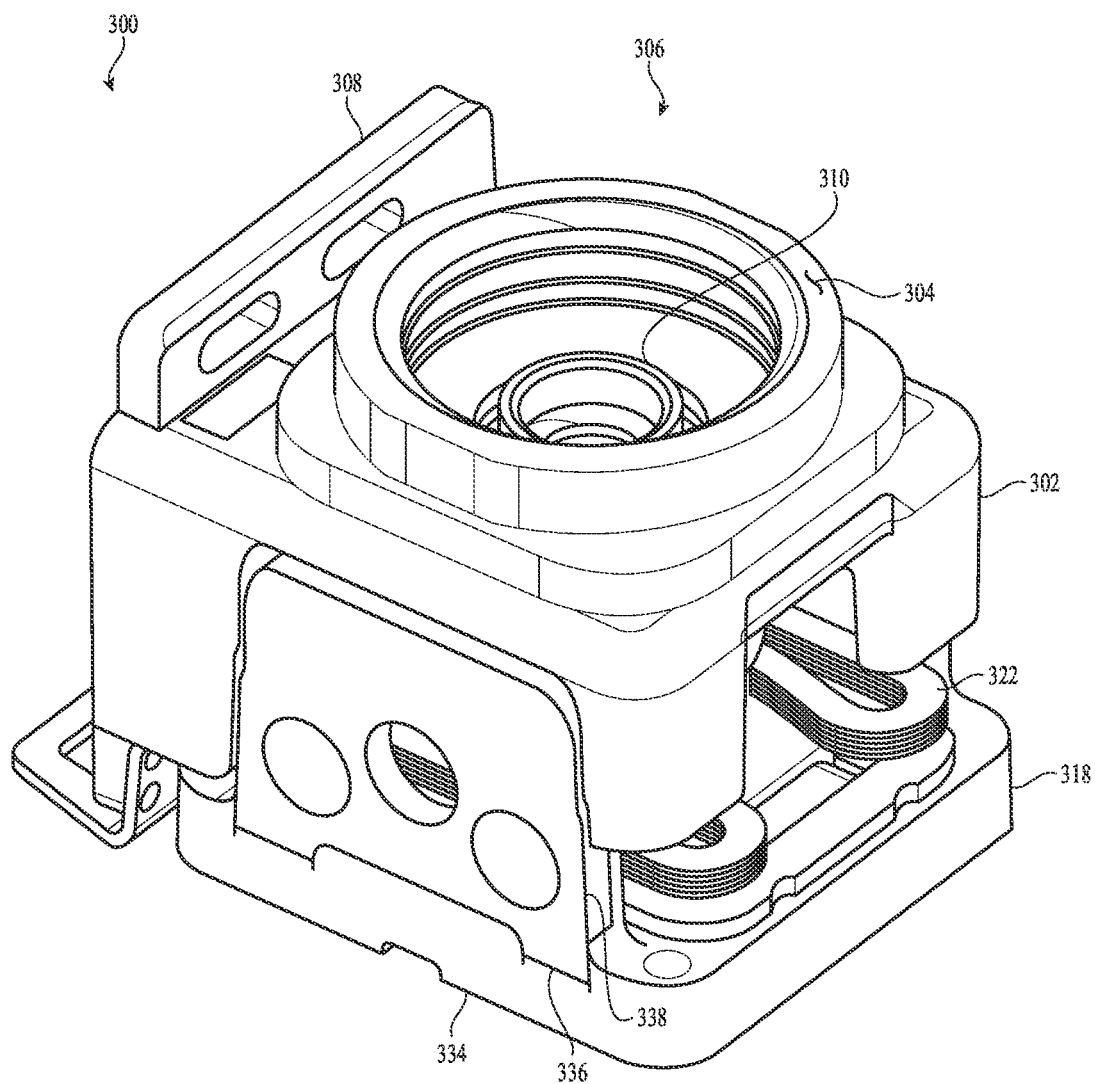
FIG. 3A depicts a portion of an input system for a wearable electronic device.

FIG. 3A depicts a sub-assembly 300 of a crown input system, showing components in an assembled configuration. The sub-assembly 300 may include a frame 302 and a bracket 318 (which may be an embodiment of the bracket 218, described with respect to FIG. 2). Together, the frame 302 and the bracket 318 may at least partially enclose a portion of a crown assembly. For example, as shown in FIG. 3A, an optical encoder component 310, which may be attached to a crown shaft, may be positioned within an internal volume defined by the frame 302 and the bracket 318.

The sub-assembly 300 may also include a friction guard 322 (which may be an embodiment of the friction guard 222) and an optical encoder component 310 (which may be an embodiment of the optical encoder component 210). The bracket 318, friction guard 322, and optical encoder component 310 may include the same or similar components and may provide the same or similar functions as the corresponding components described with respect to FIG. 2. Accordingly, details of the components described with respect to FIG. 2 may apply equally to those in FIG. 3A, and for brevity will not be repeated here.

In some cases the portion of the input system shown in FIG. 3A may be a self-contained subassembly. For example, the components shown in FIG. 3A may be assembled together separately from other components, and then integrated with other components of the device, such as a housing, an actuation member, and the like. In this way, components that require tight tolerances and high assembly precision (e.g., the friction guard, the barrel, the frame, and the switch) may be pre-assembled into a secure sub-assembly 300 that can then be incorporated into a device without requiring separate alignment or re-alignment of the components of the sub-assembly 300.

The frame 302 may be attached to a housing of a device, for example via a mounting portion 308. The mounting portion 308 may include openings for receiving fasteners that secure the frame 302 to the housing (e.g., screws, bolts, posts, rivets, welds, stakes, or the like). In some cases, the frame 302 is instead or additionally secured to the housing using adhesives, anchor structures, or any other suitable coupling technique or component. The frame 302 may be formed from or include any suitable material, such as metal, metal alloy, polymer, carbon fiber, or the like. The frame 302 may be a monolithic component, or it may comprise multiple different components that are attached together.

The frame 302 may define an opening 306 that is configured to receive a locking member (e.g., a locking member 404, FIG. 4). The locking member may engage threads in the opening 306 and may capture a portion of a side wall of a housing between a mounting face 304 of the frame 302 and the locking member. An example arrangement of a frame, locking member, and side wall of a housing is shown in FIG. 4.

The bracket 318 may include a body structure 334 (which may be an embodiment of the body structure 234, FIG. 2), and a support structure 336. The body structure 334 may be formed of a polymer material, and may at least partially encapsulate the support structure 336, which may be formed of or include a metal. For example, the support structure 336 may be inserted into a mold cavity, and a polymer or other moldable material may be injected into the mold cavity to partially encapsulate the support structure 336.

The bracket 318 may be attached to the frame 302. For example, the support structure 336 may define flanges 338 that overlap and are secured to a portion of the frame 302. The flanges 338, which may be metal, may be secured to the portion of the frame 302 via any suitable technique, such as welding, brazing, soldering, adhesive, fasteners, or the like. In some cases, the bracket 318 and the frame 302 are carefully aligned, prior to being secured together, to establish the proper alignment and tolerances of the components within the assembly. For example, the positioning of the frame 302 relative to the bracket may define the inner dimension of the assembly, which may define parameters such as the biasing force applied by the friction guard 322 on the optical encoder component 310, the distance between the friction guard 322 and the switch (e.g., the switch 216, FIG. 2), and so forth. Once the frame 302 and the bracket 318 are satisfactorily aligned, they may be secured together (e.g., via welds along the flanges 338, which may be formed of or include metal).

Figure 3B:
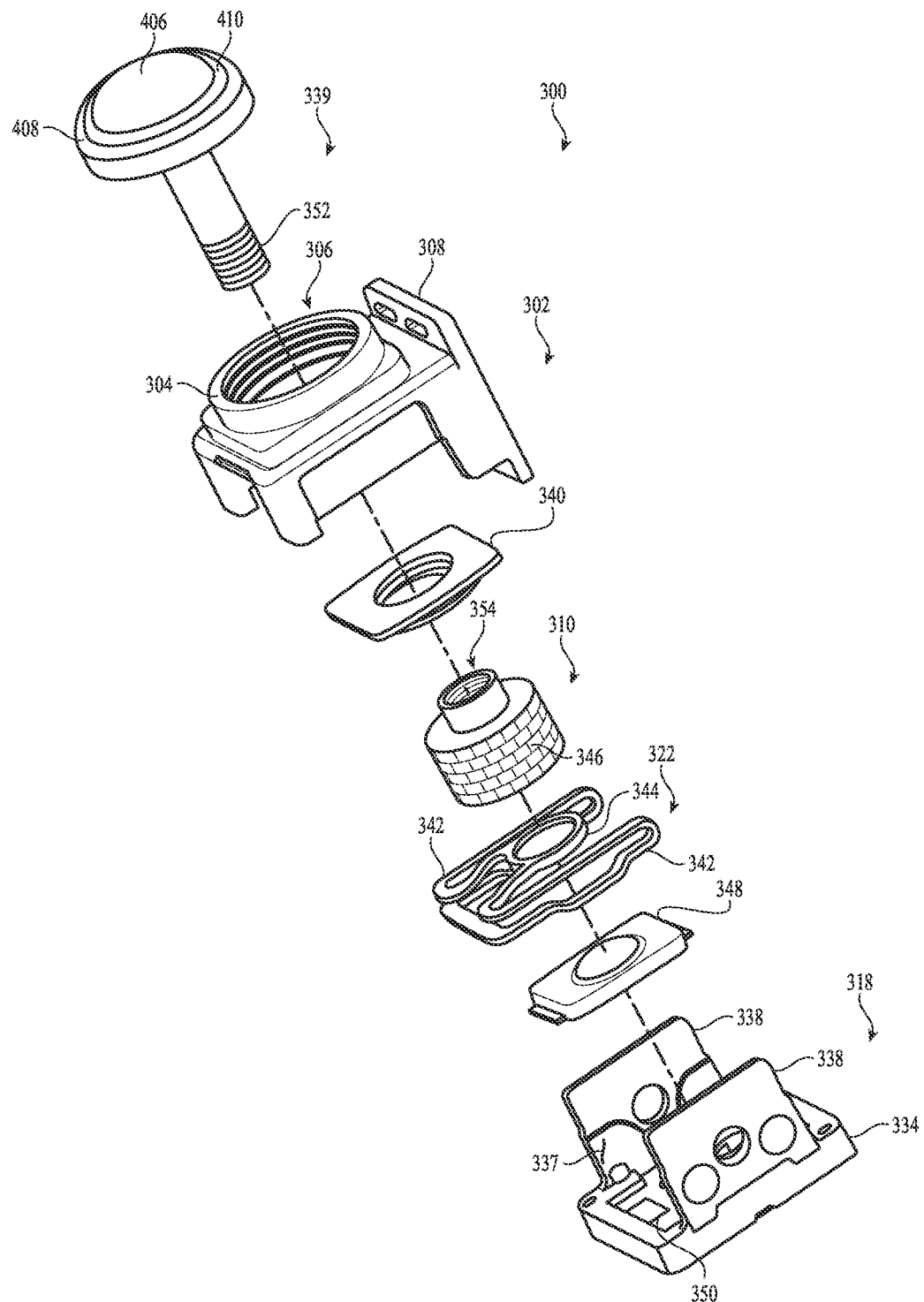
FIG. 3B depicts an exploded view of an input system for a wearable electronic device.

FIG. 3B is an exploded view of the sub-assembly 300, illustrating additional details of the various components and their arrangement. FIG. 3B includes an actuation member 339 (which may be an embodiment of the actuation member 204, FIG. 2). The actuation member 339 may include a threaded region 352 that engages a threaded opening 354 of the optical encoder component 310. The actuation member 339 may be threaded to the optical encoder component 310 after the optical encoder component 310 is assembled into the configuration shown in FIG. 3A.

The sub-assembly 300 may also include a wear plate 340 that is positioned between an inner surface of the frame 302 and a surface of the optical encoder component 310. The wear plate 340 may be configured to reduce friction on the frame 302 due to the rotation of the optical encoder component 310 during rotational inputs to the actuation member 339. The wear plate 340 may also electrically isolate the optical encoder component 310 from the frame 302. More particularly, as noted above, the optical encoder component 310 may define part of the conductive path between the actuation member 339 and biometric sensing circuitry. Thus, the optical encoder component 310 may need to be electrically isolated from conductive components that do not define the conductive path (e.g., components that may be grounded or otherwise interfere with the propagation of signals along the conductive path). Accordingly, the wear plate 340 may be formed of or include an insulating material. In one example construction, the wear plate 340 includes a first metal layer that contacts the optical encoder component 310, a second metal layer that contacts (and is optionally welded to) an inner surface of the frame 302, and an insulating layer between the first and second metal layers. The first and second metal layers may be secured to the insulating layer (which may be a plastic, rubber, foam, or any other suitable material) by adhesive (e.g., a pressure-sensitive adhesive (PSA), heat-sensitive adhesive (HSA), epoxy, cyanoacrylate, or any other suitable adhesive). FIG. 4 shows an example cross-section of a wear plate having multiple layers as described herein.

FIG. 3B also shows additional details of the friction guard 322 and the bracket 318 from FIG. 3A. For example, the friction guard 322 includes a shear plate 344 (which may be an embodiment of the shear plate 226, FIG. 2) and support legs 342 (which may be embodiments of the support legs 224, FIG. 2). The support legs 342 may be flexible and/or deformable, and may act as spring members that support the shear plate 344 and apply a biasing force against the optical encoder component 310 when the sub-assembly 320 is assembled. The support legs 342 may contact a contact portion 350 of a conductor in the bracket 318 to further define the conductive path to the sensing component. The friction guard 322 may be secured to the bracket 318 via adhesive, welding, soldering, brazing, mechanical interlocks, heat staking, or the like. For example, the support legs 342 may be soldered to the contact portion 350 of the bracket 318. The friction guard 322 may also be configured so that the shear plate 344 does not contact the top of the switch 348 when the crown is in an unactuated state (e.g., it is in a rest position and is not being actuated axially). This may help prevent unnecessary wear on the switch 348 and the other components of the crown input system.

The body structure 334 of the bracket 318, which may be formed of an electrical insulator such as a polymer, may extend at least part way up the flanges 338, as shown in FIG. 3B. This extended portion 337 of the body structure 334 may be adjacent the friction guard 322, thus ensuring electrical isolation between the friction guard 322 and the conductive (e.g., metal) support structure 336. The body structure 334 of the bracket 318 may also electrically isolate the flanges 338 (and/or other conductive portions of the bracket 318) from a conductor that is at least partially encapsulated in the body structure 334 and that defines the contact portions 350, 353 (e.g., the conductor 229 or an embodiment thereof). More particularly, the body structure 334 may electrically insulate the conductor from other metallic or conductive components that may otherwise ground or otherwise disrupt the conductive path through the crown input system.

Figure 3C:
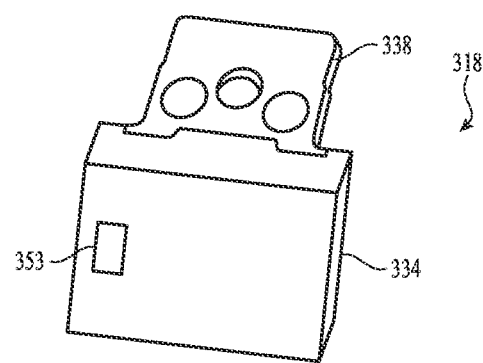
FIG. 3C depicts a component of the input system of FIG. 3B.

FIG. 3C shows an underside view of the bracket 318 of FIGS. 3A-3B. As described above, the bracket 318 may include a conductor (e.g., the conductor 229, FIG. 2) that is at least partially encapsulated in the body structure 334. As shown in FIG. 3C, a portion of the conductor may be exposed along an exterior surface of the bracket 318 to define an exterior contact portion 353. The exterior contact portion 353 may be conductively coupled to biometric sensing circuitry. More particularly, the exterior contact portion 353 may provide convenient access to the conductive path of the crown, which may otherwise be difficult to physically access as many of the components that define the conductive path may be at least partially encased and/or enclosed in other components (e.g., the frame 302, the bracket 318, etc.) and thus may be otherwise difficult to access in order to complete the conductive path to the biometric sensing circuitry. The contact portion 350 (FIG. 3B) and the exterior contact portion 353 (FIG. 3C) may be portions of a single conductor, such as a metal member.

FIG. 4 is a cross-sectional view of a crown input system installed in a housing. For example, FIG. 4 shows the components of the sub-assembly 300, shown in FIGS. 3A-3B, in a housing defining a side wall 402. The cross-sectional view may correspond to a view through line A-A in FIG. 1.

FIG. 4 illustrates how a mounting face 304 of the frame 302 contacts an inner surface of the side wall 402 of the housing, and a locking member 404 engages with the threads of the frame 302 to capture and/or compress the side wall 402 between the mounting face 304 and a flange of the locking member 404. A seal 412 may be positioned at an interface between the locking member 404 and the side wall 402 to help prevent ingress of water, dust, debris, or other contaminants into the internal volume of the device.

FIG. 4 also illustrates an example crown assembly that is formed from multiple discrete components. For example, the crown assembly may include the optical encoder component 310 and an actuation member that includes a crown shaft 406 and a crown ring 408 coupled to the crown shaft and electrically isolated from the crown shaft (e.g., by an electrical insulating assembly 410, which may be formed from a polymer or other suitable insulating material(s)). In this example, the crown ring 408 may not define part of the conductive path through the crown assembly, and instead the axial end surface of the crown shaft 406 (which is external to the housing and therefore accessible by a user) may define the input surface for the biometric sensor. The actuation member may be coupled to the optical encoder component 310 via threads on the crown shaft 406, as described herein.

The crown ring 408 may include tactile features such as grooves, splines, ridges, textures, or the like, formed on an exterior surface of the crown ring 408 (e.g., the portion of the crown ring that a user touches when providing rotational inputs). The tactile features may be positioned around a circumference of the crown ring 408. For example, the tactile features may include a series of tactile features (e.g., grooves, channels) spaced regularly around a circumferential surface of the crown ring 408. The tactile features may improve a tactile feel of the crown during rotational inputs. For example, the tactile features may provide greater grip or friction between the crown ring 408 and a user's finger, as compared to a smooth or un-featured crown ring 408.

The crown shaft 406 may be electrically isolated from the locking member 404 via one or more bushings 413. The bushings 413 may be formed from a rubber, polymer, or other electrically insulating material. The bushings 413 may also act as guides for the crown shaft 406 to provide smooth operation and maintain alignment, and also to seal the assembly and prevent ingress of water or other contaminants.

FIG. 4 also shows the overlap between the frame 302 and the flanges 338, where the flanges 338 may be affixed to the frame 302. Also, FIG. 4 shows how a three-layer wear plate 340 may be positioned between an inner surface of the frame 302 and the optical encoder component 310 to prevent frictional contact between the optical encoder component 310 and the frame 302 and to maintain electrical separation between the frame 302 and the optical encoder component 310. FIG. 4 further shows an electrically conductive lubricant 414 (e.g., conductive grease) applied at the interface between the shear plate 344 of the friction guard and the end of the optical encoder component 310.

Figure 5:
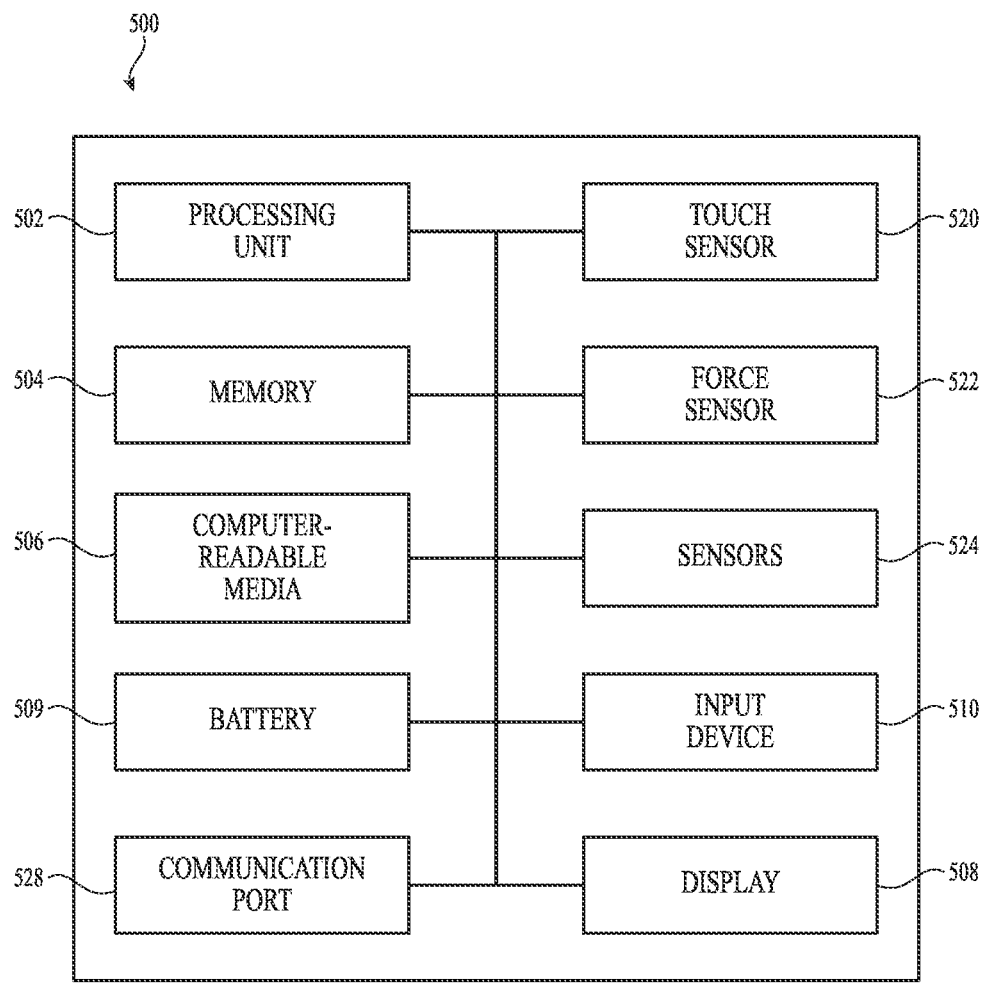
FIG. 5 depicts example components of a wearable electronic device.

FIG. 5 depicts an example schematic diagram of an electronic device 500. By way of example, the device 500 of FIG. 5 may correspond to the wearable electronic device 100 shown in FIG. 1 (or any other wearable electronic device described herein). To the extent that multiple functionalities, operations, and structures are disclosed as being part of, incorporated into, or performed by the device 500, it should be understood that various embodiments may omit any or all such described functionalities, operations, and structures. Thus, different embodiments of the device 500 may have some, none, or all of the various capabilities, apparatuses, physical features, modes, and operating parameters discussed herein.

As shown in FIG. 5, a device 500 includes a processing unit 502 operatively connected to computer memory 504 and/or computer-readable media 506. The processing unit 502 may be operatively connected to the memory 504 and computer-readable media 506 components via an electronic bus or bridge. The processing unit 502 may include one or more computer processors or microcontrollers that are configured to perform operations in response to computer-readable instructions. The processing unit 502 may include the central processing unit (CPU) of the device. Additionally or alternatively, the processing unit 502 may include other processors within the device including application specific integrated chips (ASIC) and other microcontroller devices.

The memory 504 may include a variety of types of non-transitory computer-readable storage media, including, for example, read access memory (RAM), read-only memory (ROM), erasable programmable memory (e.g., EPROM and EEPROM), or flash memory. The memory 504 is configured to store computer-readable instructions, sensor values, and other persistent software elements. Computer-readable media 506 also includes a variety of types of non-transitory computer-readable storage media including, for example, a hard-drive storage device, a solid-state storage device, a portable magnetic storage device, or other similar device. The computer-readable media 506 may also be configured to store computer-readable instructions, sensor values, and other persistent software elements.

In this example, the processing unit 502 is operable to read computer-readable instructions stored on the memory 504 and/or computer-readable media 506. The computer-readable instructions may adapt the processing unit 502 to perform the operations or functions described above with respect to FIGS. 1-4. In particular, the processing unit 502, the memory 504, and/or the computer-readable media 506 may be configured to cooperate with a sensor 524 (e.g., a rotation sensor that senses rotation of a crown component or a sensor that senses motion of a user's finger) to control the operation of a device in response to an input applied to a crown of a device (e.g., the crown 112). The computer-readable instructions may be provided as a computer-program product, software application, or the like.

As shown in FIG. 5, the device 500 also includes a display 508. The display 508 may include a liquid-crystal display (LCD), organic light emitting diode (OLED) display, light emitting diode (LED) display, or the like. If the display 508 is an LCD, the display 508 may also include a backlight component that can be controlled to provide variable levels of display brightness. If the display 508 is an OLED or LED type display, the brightness of the display 508 may be controlled by modifying the electrical signals that are provided to display elements. The display 508 may correspond to any of the displays shown or described herein.

The device 500 may also include a battery 509 that is configured to provide electrical power to the components of the device 500. The battery 509 may include one or more power storage cells that are linked together to provide an internal supply of electrical power. The battery 509 may be operatively coupled to power management circuitry that is configured to provide appropriate voltage and power levels for individual components or groups of components within the device 500. The battery 509, via power management circuitry, may be configured to receive power from an external source, such as an AC power outlet. The battery 509 may store received power so that the device 500 may operate without connection to an external power source for an extended period of time, which may range from several hours to several days.

In some embodiments, the device 500 includes one or more input devices 510. An input device 510 is a device that is configured to receive user input. The one or more input devices 510 may include, for example, a crown input system, a push button, a touch-activated button, a keyboard, a key pad, or the like (including any combination of these or other components). In some embodiments, the input device 510 may provide a dedicated or primary function, including, for example, a power button, volume buttons, home buttons, scroll wheels, and camera buttons.

The device 500 may also include a sensor 524. The sensor 524 may detect inputs provided by a user to a crown of the device (e.g., the crown 112). As described above, the sensor 524 may include sensing circuitry and other sensing components that facilitate sensing of rotational motion of a crown, as well as sensing circuitry and other sensing components (optionally including a switch) that facilitate sensing of axial motion of the crown. The sensor 524 may include components such as an optical detector (e.g., the optical detector 212), a barrel (e.g., the barrels 210, 310), a tactile or dome switch (e.g., the switches 216, 348), or any other suitable components or sensors that may be used to provide the sensing functions described herein. The sensor 524 may also be a biometric sensor, such as a heart rate sensor, electrocardiograph sensor, temperature sensor, or any other sensor that conductively couples to user and/or to the external environment through a crown input system, as described herein. In cases where the sensor 524 is a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like.

The device 500 may also include a touch sensor 520 that is configured to determine a location of a touch on a touch-sensitive surface of the device 500 (e.g., an input surface defined by the portion of a cover 108 over a display 109). The touch sensor 520 may use or include capacitive sensors, resistive sensors, surface acoustic wave sensors, piezoelectric sensors, strain gauges, or the like. In some cases the touch sensor 520 associated with a touch-sensitive surface of the device 500 may include a capacitive array of electrodes or nodes that operate in accordance with a mutual-capacitance or self-capacitance scheme. The touch sensor 520 may be integrated with one or more layers of a display stack (e.g., the display 109) to provide the touch-sensing functionality of a touchscreen. Moreover, the touch sensor 520, or a portion thereof, may be used to sense motion of a user's finger as it slides along a surface of a crown, as described herein.

The device 500 may also include a force sensor 522 that is configured to receive and/or detect force inputs applied to a user input surface of the device 500 (e.g., the display 109). The force sensor 522 may use or include capacitive sensors, resistive sensors, surface acoustic wave sensors, piezoelectric sensors, strain gauges, or the like. In some cases, the force sensor 522 may include or be coupled to capacitive sensing elements that facilitate the detection of changes in relative positions of the components of the force sensor (e.g., deflections caused by a force input). The force sensor 522 may be integrated with one or more layers of a display stack (e.g., the display 109) to provide force-sensing functionality of a touchscreen.

The device 500 may also include a communication port 528 that is configured to transmit and/or receive signals or electrical communication from an external or separate device. The communication port 528 may be configured to couple to an external device via a cable, adaptor, or other type of electrical connector. In some embodiments, the communication port 528 may be used to couple the device 500 to an accessory, including a dock or case, a stylus or other input device, smart cover, smart stand, keyboard, or other device configured to send and/or receive electrical signals.

As described above, one aspect of the present technology is the gathering and use of data available from a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. For example, where the sensor described above is a biometric sensor, sensitive and/or personal information may be captured about a user (e.g., health-related data).

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic watch comprising:
a housing;
a touch-sensitive display at least partially enclosed by the housing;
a crown assembly comprising:
a crown shaft extending through a side wall of the housing;
a crown ring electrically isolated from the crown shaft; and
a sensor component coupled to the crown shaft;
an optical detector configured to detect rotation of the crown assembly using the sensor component; and
a sensing system conductively coupled to an axial end surface of the crown assembly by a conductive path defined by a set of components comprising the crown shaft and the sensor component.

2. The electronic watch of claim 1, further comprising:
a switch configured to be actuated by the crown assembly in response to a translational input applied to the crown assembly; and
a conductive spring element having a portion positioned between the switch and the sensor component, wherein the set of components defining the conductive path further includes the conductive spring element.

3. The electronic watch of claim 2, wherein:
the electronic watch further comprises a body structure within the housing and positioned at an end of the crown assembly; and
the switch is coupled to the body structure.

4. The electronic watch of claim 3, wherein:
the body structure comprises a polymer material at least partially encapsulating a conductor; and
the conductive spring element is conductively coupled to the conductor.

5. The electronic watch of claim 4, wherein the set of components defining the conductive path further includes the conductor.

6. The electronic watch of claim 2, wherein the conductive spring element comprises a support leg that is configured to flex in response to the translational input.

7. The electronic watch of claim 2, wherein:
the portion of the conductive spring element positioned between the switch and the sensor component is a friction guard;
the crown assembly is rotatable relative to the housing;
the crown assembly rotates against the friction guard when the crown assembly is rotated; and
the friction guard protects the switch from rotational friction from the crown assembly.

8. An electronic watch comprising:
a housing;
biometric sensing circuitry at least partially enclosed by the housing; and
a crown assembly defining an axial end surface external to the housing and configured to receive a touch input, the crown assembly comprising:
a crown shaft; and
a sensor component coupled to the crown shaft;
a switch assembly configured to detect translation of the crown assembly;
a conductive spring element having a portion positioned between the sensor component and the switch assembly; and
sensing circuitry configured to detect the touch input via a conductive path defined at least in part by the crown shaft and the conductive spring element.

9. The electronic watch of claim 8, wherein the biometric sensing circuitry is part of an electrocardiograph sensor.

10. The electronic watch of claim 8, wherein the conductive path is further defined by the sensor component.

11. The electronic watch of claim 10, further comprising a rotation sensing system including:
an optical emitter configured to direct light onto the sensor component; and
an optical detector configured to receive at least a portion of the light reflected by the sensor component.

12. The electronic watch of claim 8, wherein:
the electronic watch further comprises a bracket positioned within the housing; and
the switch assembly is coupled to the bracket and positioned between the bracket and an end of the crown assembly.

13. The electronic watch of claim 12, wherein:
the bracket comprises:
  a polymer body; and
  a conductor at least partially encapsulated in the polymer body; and
the conductor is conductively coupled to the conductive spring element and defines part of the conductive path.

14. The electronic watch of claim 12, wherein the conductive spring element imparts a force on the switch assembly in response to a translational input applied to the axial end surface of the crown assembly.

15. An electronic device comprising:
a housing at least partially defining an internal volume;
an electrocardiograph sensing system within the internal volume;
a crown assembly having an external portion positioned outside of the internal volume and configured to receive a rotational input and a translational input; and
a switch bracket within the internal volume and positioned at an end of the crown assembly, the switch bracket comprising:
  a body structure;
  a switch coupled to the body structure and configured to detect the translational input; and
  a conductor at least partially encapsulated in the body structure, wherein:
the conductor and at least part of the crown assembly define at least a portion of a conductive path configured to conductively couple the electrocardiograph sensing system to an object in contact with the external portion of the crown assembly.

16. The electronic device of claim 15, wherein:
the crown assembly comprises:
  a crown shaft having an internal portion within the internal volume; and
  a sensor component attached to the internal portion of the crown shaft; and
the electronic device further comprises an optical detector configured to detect the rotational input by detecting rotation of the sensor component.

17. The electronic device of claim 16, wherein the crown shaft and the sensor component define at least a portion of the conductive path.

18. The electronic device of claim 17, wherein the crown assembly further includes a crown ring coupled to the crown shaft defining a user contact portion of the crown assembly.

19. The electronic device of claim 18, wherein the crown ring is electrically isolated from the crown shaft.

20. The electronic device of claim 15, wherein:
the electronic device further includes a conductive spring element having a portion positioned between the crown assembly and the switch;
the conductive spring element is conductively coupled to the conductor; and
the conductive path includes the conductive spring element.

* * * * *